United States Patent Office.

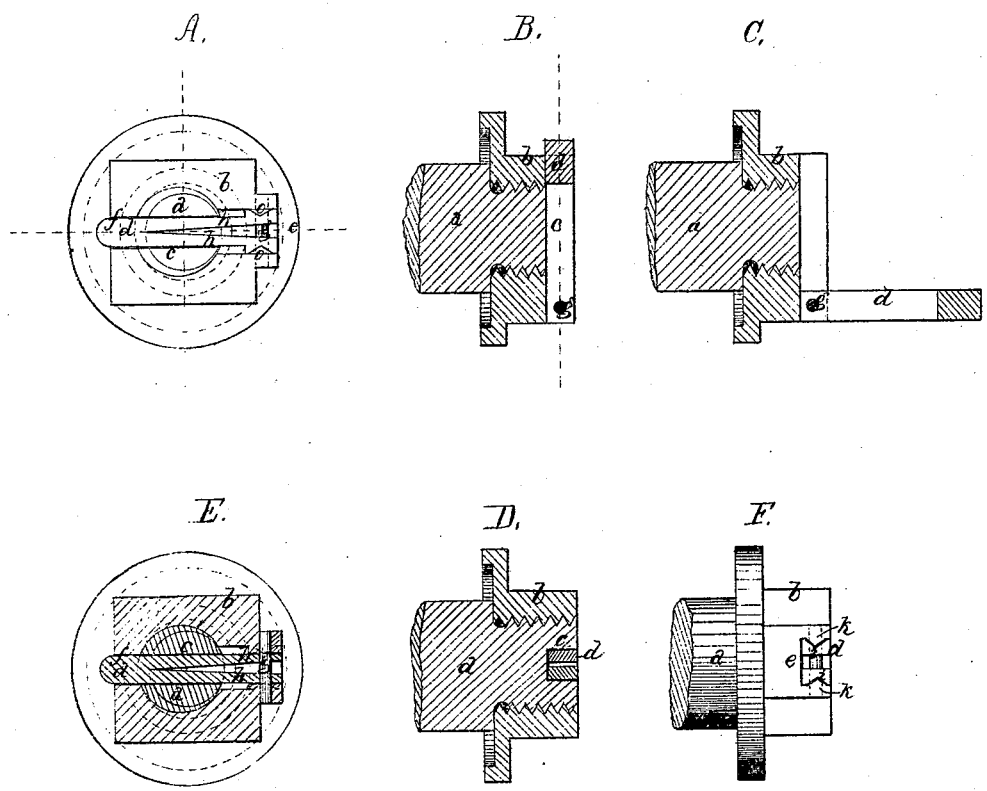

CHAUNCEY THOMAS, OF BOSTON, MASSACHUSETTS.

Letters Patent No. 104,901, dated June 28, 1870.

IMPROVEMENT IN AXLE-NUTS AND AXLES.

The Schedule referred to in these Letters Patent and making part of the same

*To all whom it may concern:*

Be it known that I, CHAUNCEY THOMAS, of Boston, in the county of Suffolk and State of Massachusetts, have invented an Improvement in Axle-Nuts and Axles; and I do hereby declare that the following, taken in connection with the drawing which accompanies and forms part of this specification, is a description of my invention sufficient to enable those skilled in the art to practice it.

In common road-carriages, the wheels are generally kept upon their axles by nuts, which confine each wheel-box between a flange on the axle at one end of the box, and a washer (between the nut and the box) at the outer end of the axle.

To keep the nut in place, it is always turned onto the screw-threaded end of the axle in the same direction the wheel rotates; but notwithstanding this precaution, and notwithstanding the employment of check-nuts, and of pins running through the nut and axle, axle-nuts will sometimes get loose and come off, causing the wheel to fall from the axle, and the carriage-body to drop. This is particularly the case with capped axles, because the cap covers the nut and keeps it from sight.

The object of my invention is to so apply the nut that it cannot be displaced by accident, the provision for such application, however, enabling the nut to be readily removed by design.

To accomplish this I cut a slot in the end of the axle, (diametrically across it,) and also correspondingly slot the outer face of the nut, and hinge to the nut, in one of its slots, a latch, pin, or key, which, when shut against the axle, enters the slots in the end of the axle, and in the opposite side of the nut, and keys the axle and nut together, or so that there can be no relative rotation, while, when the key is swung out, it clears the slot in the axle, enabling the nut to be easily removed.

It is in a nut so connected to the axle that my invention primarily consists.

The key is, preferably, so made and hinged, or jointed to the nut, that it closes with a spring and opens with a spring, like a pocket-knife blade, it being thus kept from rattling or loosening, as well as from displacement.

The drawing represents one end of an axle and a nut, embodying my invention.

A shows an end view of them.

B an axial section, the bolt being shut into the end of the axle.

C is a similar section, the bolt being opened or thrown out from the axle.

D is an axial section, taken across the key.

E is a cross-section through the key.

F is a side view of the nut.

*a* denotes the axle, and

*b* the nut.

In the end of the axle the slot *c* is cut, the slot being deep enough to receive a key or latch, *d*.

One end of this latch or key is jointed or hinged in a slot, *e*, cut in the face of the nut *b*, on one side of the axle, and the other end of the key fits into a slot, *f*, cut in the nut on the opposite side of the nut-thread, so that, when the bolt is thrown down against the axle-end, it extends through the slots in the axle and nut, and locks the nut and axle from rotation, the key, preferably, sinking into the end of the axle, in such manner that the outer surfaces of nut, key, and axle shall be flush.

When the key or latch is swung out on its hinge-pin *g*, as seen at C, it leaves the nut free to turn, as will be readily understood.

As before observed, I prefer to make the latch (with reference to its opening and closing) as a spring, its construction being as follows:

The latch or key is bifurcated at its hinged end, and the two prongs *h h* normally spring open, as seen at A. In the outer side of each is an angular notch, *i*, and extending from each adjacent wall of the nut-slot *e* is an angular projection, *k*, and, when the latch is thrown down toward the axle-end, its prongs are first pressed together by the action of the projection *k*, but spread apart by their spring (the notches flying over the projections) as the latch enters the axle-slot, the meshing of the angular notches and projections locking the latch in position, as will be readily understood.

The prongs may have a second set of notches, *o o*, to hold the latch in open position when it is thrown out from the axle-slot.

It will be obvious that this construction insures the safety of the nut as to its removal from the axle, and enables a capped axle to be used, with a certainty that the nut cannot escape from the axle.

I claim—

A nut and axle, in which the nut is kept from rotation (when screwed upon the axle) by a hinged latch or key, which enters slots in the nut and axle, substantially as described.

Also, a nut, having a latch or key hinged or jointed to it, substantially as shown and described.

Also, in combination with the nut, a latch or key, having provision for holding it down to the nut, or standing out therefrom, substantially as described.

CHAUNCEY THOMAS.

Witnesses:
J. B. CROSBY,
FRANCIS GOULD.